United States Patent
Yang et al.

(10) Patent No.: US 8,762,487 B2
(45) Date of Patent: Jun. 24, 2014

(54) METHOD OF PERFORMING A SERVICE GROUP DISCOVERY PROCEDURE IN A COMMUNICATION SYSTEM AND RELATED COMMUNICATION DEVICE

(75) Inventors: Ju-Ting Yang, Taoyuan County (TW); Yin-Yeh Tseng, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 189 days.

(21) Appl. No.: 13/284,997

(22) Filed: Oct. 31, 2011

(65) Prior Publication Data

US 2012/0106563 A1 May 3, 2012

Related U.S. Application Data

(60) Provisional application No. 61/407,915, filed on Oct. 29, 2010.

(51) Int. Cl.
*G06F 15/16* (2006.01)
(52) U.S. Cl.
USPC .......................................... 709/217
(58) Field of Classification Search
USPC ................................. 709/217–219
See application file for complete search history.

(56) References Cited

U.S. PATENT DOCUMENTS

| 2010/0284390 A1* | 11/2010 | Lee et al. ...................... 370/338 |
|---|---|---|
| 2011/0182205 A1 | 7/2011 | Gerdes |

FOREIGN PATENT DOCUMENTS

| CN | 101489300 A | 7/2009 |
|---|---|---|
| CN | 101611609 A | 12/2009 |
| JP | H05134959 A | 6/1993 |
| JP | H10254890 A | 9/1998 |
| JP | 2001517044 A | 10/2001 |
| JP | 2002261926 A | 9/2002 |
| JP | 2008530850 A | 8/2008 |
| KR | 1020100053714 A | 5/2010 |
| WO | 9914960 A1 | 3/1999 |
| WO | 2006083140 A1 | 8/2006 |
| WO | 2010050643 A1 | 5/2010 |

OTHER PUBLICATIONS

Office Action mailed on Mar. 12, 2013 for the Japanese Application No. 2011-239602, filing date Oct. 31, 2011, pp. 1-4.
OMA, OMA-RD-CPNS-V1_0-20091117-C "Converged Personal Network Service Requirements", Nov. 2009.
OMA, OMA-TS-CPNS_Core-V1_0-20101025-D "Converged Personal Network Service Core Technical Specification", Oct. 2010.
Notice of allowance mailed on Feb. 28, 2013 for the Korean application No. 10-2011-0112441, filing date Oct. 31, 2011, pp. 1-2.

(Continued)

*Primary Examiner* — Fan Ng
(74) *Attorney, Agent, or Firm* — Winston Hsu; Scott Margo

(57) ABSTRACT

A method of performing a Service Group (SG) Discovery procedure in a communication system is disclosed. The method comprises transmitting a Request message from a first personal network element (PNE) to a personal network (PN) gateway (GW) or the PN GW to a Converged Personal Network Service (CPNS) Server; and transmitting a Response message from the PN GW to the first PNE or the CPNS Server to the PN GW according to the Request message. The Request message comprises at least one of an OriginEntityID, and a first SGInfo which comprises a keyword, or the Response message comprises a second SGInfo.

14 Claims, 4 Drawing Sheets

(56) References Cited

OTHER PUBLICATIONS

European patent application No. 11008724.4, European Search Report mailing date: Dec. 30, 2011.

Notice of allowance mailed on Oct. 1, 2013 for the Japanese application No. 2011-239602, filed Oct. 31, 2011, pp. 1-3.

Office action mailed on Jan. 30, 2014 for the China application No. 201110338615.1, filed Oct. 31, 2011.

* cited by examiner

METHOD OF PERFORMING A SERVICE GROUP DISCOVERY PROCEDURE IN A COMMUNICATION SYSTEM AND RELATED COMMUNICATION DEVICE

CROSS REFERENCE TO RELATED APPLICATIONS

This application claims both the benefit of U.S. Provisional Application No. 61/407,915, filed on Oct. 29, 2010, entitled "Message Content and Format of Service Group Query Message in CPNS", the contents of which are incorporated herein in their entirety.

BACKGROUND OF THE INVENTION

1. Field of the Invention

The present invention relates to a method used in a communication system and related communication device, and more particularly, to a method of performing a Service Group Discovery procedure in a communication system and related communication device.

2. Description of the Prior Art

The Open Mobile Alliance (OMA) is founded to develop OMA specifications for mobile services to meet users' needs. Furthermore, the OMA specifications aim to provide the mobile services which are interoperable across geographic areas (e.g. countries), operators, service providers, networks, operation systems and mobile devices. In detail, the mobile services conforming to the OMA specifications can be used by the users without restriction to particular operators and service providers. The mobile services conforming to the OMA specifications are also bearer agnostic, i.e., the bearer that carries the mobile services can be a second generation (2G) mobile system such as GSM, EDGE or GPRS, or a third generation (3G) and beyond mobile system such as UMTS, LTE or LTE-Advanced. Further, the mobile services can be executed on an operation system such as Windows, Android or Linux operated on various mobile devices. Therefore, industries providing devices or the mobile services supporting the OMA specifications can benefit from a largely growing market enabled by interoperability of the mobile services. Besides, the users use the devices or the mobile services supporting the OMA specifications can also have a better experience due to the interoperability of the mobile services.

Furthermore, Converged Personal Network Services (CPNS) is developed by the OMA to provide application-layer support for ubiquitous access to services in a converged network, which is a group of Personal Networks (PNs) that are interconnected by PN Gateways (PN GWs). In detail, a basic architecture of the CPNS includes three entities which are a CPNS server, a PN GW, and one or more PN elements (PNEs), but there may be several PNGWs, or even several CPNS servers, or even service provider servers in other architectures of the CPNS. The CPNS server receives requests from the PN GW, and replies responses to the PN GW, to ensure that appropriate applications are selected and appropriate contents are provided to the PNEs via the PN GW. The PN GW serves as an intermediary entity between the PNEs and other networks that forwards the requests and the responses between the PNEs and the other networks. The PNEs are PN entities that are connected to the PN GW and between each other and are used for rendering the content received from the PN GW or from each other. The PNE can be a mobile phone, a personal computer (PC), a music player, a car navigation system or an IP-enabled set-top box.

On the other hand, the OMA develops a concept of service group (SG) for the CPNS. The SG is composed of a CPNS server, one or more PN GWs and one or more PNEs. The intention of the service group is to group together PNEs which want to receive the same service from a CPNS server or a content provider. In other words, for those PNEs that want to receive a game service can belong to a SG receiving the game service, and for those PNEs that want to receive a music service can belong to a SG receiving the music service.

Based on the CPNS protocol specification, creation of a SG is initiated by a PNE. Under such a situation, a Service Group Discovery procedure, i.e. Service Group Query procedure, is performed for the PNE to know the existence of other SGs, such that the Service Group Discovery procedure can be executed to avoid certain circumstances of redundant SG creation, e.g. existing SGs available to provide the service the PNE wants to consume, and also can be applied when the PNE tries to join other SGs. However, detailed content and format of messages of the Service Group Discovery procedure is not yet specified.

SUMMARY OF THE INVENTION

The invention therefore provides a method of performing a Service Group Discovery procedure in a communication system.

A method of performing a Service Group (SG) Discovery procedure in a communication system is disclosed. The method comprises transmitting a Request message from a first personal network element (PNE) to a personal network (PN) gateway (GW) or the PN GW to a Converged Personal Network Service (CPNS) Server; and transmitting a Response message from the PN GW to the first PNE or the CPNS Server to the PN GW according to the Request message. The Request message comprises at least one of an OriginEntityID, and a first SGInfo which comprises a keyword, or the Response message comprises a second SGInfo.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
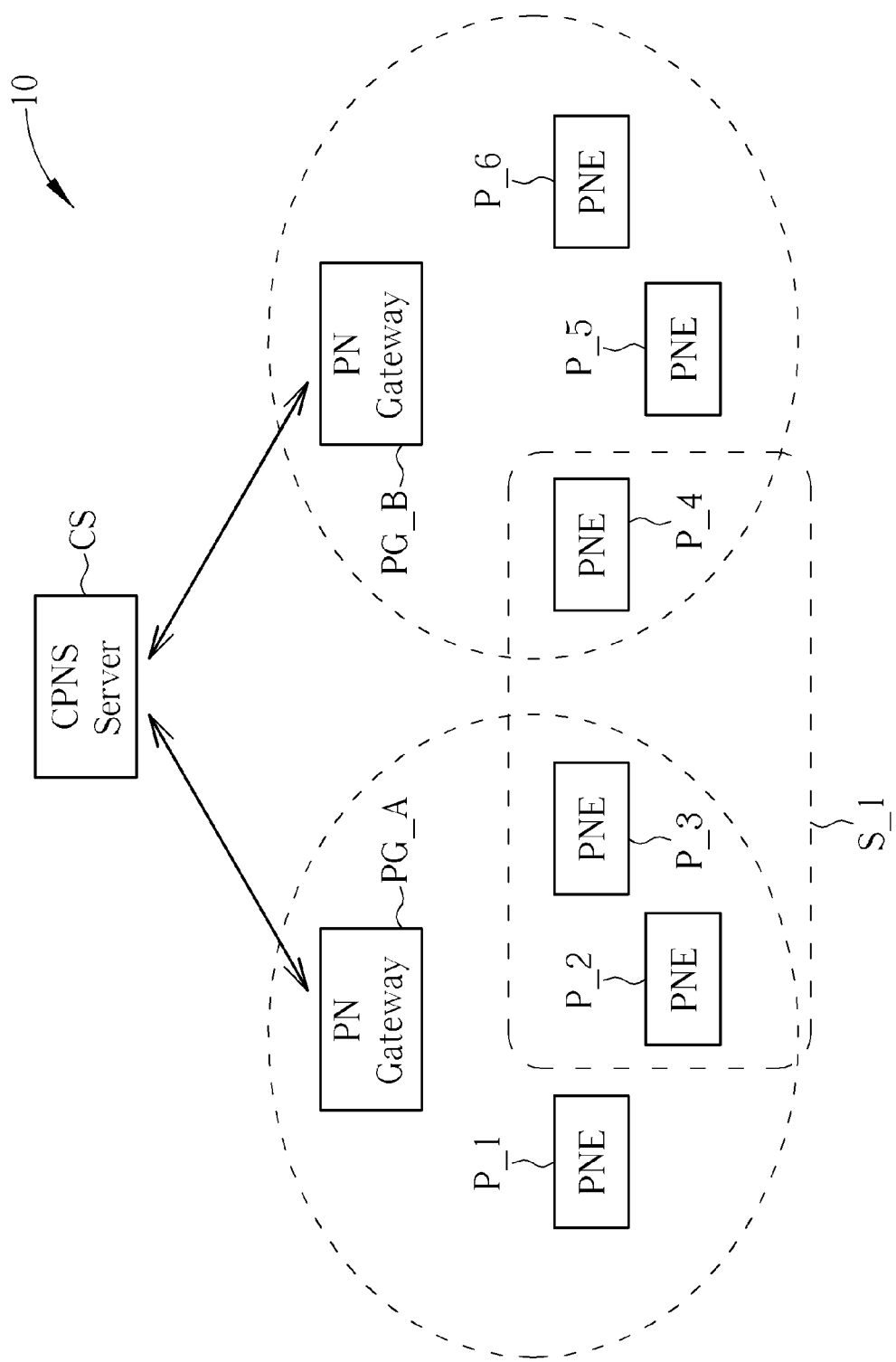
FIG. 1 is a schematic diagram of an exemplary communication system according to the present invention.

Please refer to FIG. 1, which is a schematic diagram of a communication system 10 according to an example of the present invention. The communication system 10 supports Converged Personal Network Services (CPNS) developed by the Open Mobile Alliance (OMA). The communication system 10 is briefly composed of a CPNS server CS, PN gateways (PN GWs) PG_A and PG_B, and PN elements (PNEs) P_1-P_6. In practice, an amount of the PN GWs is not limited to two, and an amount of the PNEs managed by each PN GW is also not limited to three.

In detail, in the communication system 10, the CPNS server CS receives requests from a PN GW, and replies responses to the PN GW, to ensure that appropriate applications are selected and appropriate contents are provided to a PNE managed by the PN GW. A PN GW (e.g. PN GW PG_A or PN GW PG_B) serves as an intermediary entity between the PNE and other networks that forwards the requests and the responses between the PNE and the other networks. In the communication system 10, the PNEs P_1-P_3 are managed by the PN GW PG_A, and the PNEs P_4-P_B6 are managed by the PN GW PG_B. In other words, the PN GW PG_A forwards requests, responses and services between the PNEs P_1-P_3 and the CPNS server CS. Similarly, the PN GW PG_B forwards requests, responses and services between the PNEs P_4-P_6 and the CPNS server CS. Preferably, the PNE (e.g. any one of the PNEs P_1-P_6) is a PN entity that is connected to a corresponding PN GW managing the PNE and between each other, and is used for rendering the content received from the corresponding PN GW or from each other. The PNE can be a mobile phone, a personal computer (PC), a music player, a car navigation system or an IP-enabled set-top box. Besides, PNEs P_2-P_4 in the communication system 10 belong to a service group (SG) S_1. Therefore, the PNEs P_2-P_4 can receive the same service (e.g. a game service or a music service) from the CPNS server CS or a content provider.

Figure 2:
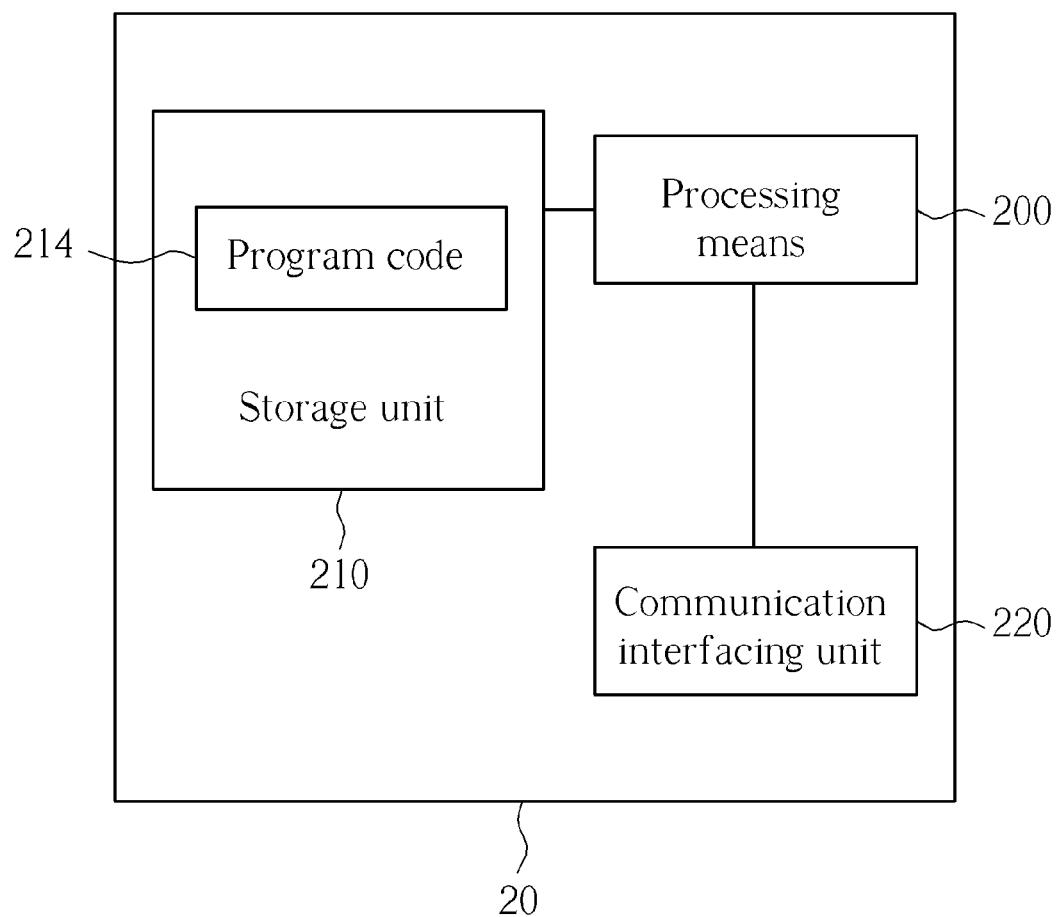
FIG. 2 is a schematic diagram of an exemplary communication device according to the present invention.

Please refer to FIG. 2, which is a schematic diagram of a communication device 20 according to an example of the present invention. The communication device 20 can be any one of the CPNS server CS, the PN GWs PG_A and PG_B, and the PNEs P_1-P_6 shown in FIG. 1, but is not limited herein. The communication device 20 may include a processor 200 such as a microprocessor or Application Specific Integrated Circuit (ASIC), a storage unit 210 and a communication interfacing unit 220. The storage unit 210 may be any data storage device that can store a program code 214, accessed by the processor 200. Examples of the storage unit 210 include but are not limited to a subscriber identity module (SIM), read-only memory (ROM), flash memory, random-access memory (RAM), CD-ROM/DVD-ROM, magnetic tape, hard disk, and optical data storage device. The communication interfacing unit 220 is preferably a transceiver and can exchange signals with the server according to processing results of the processor 200.

Figure 3:
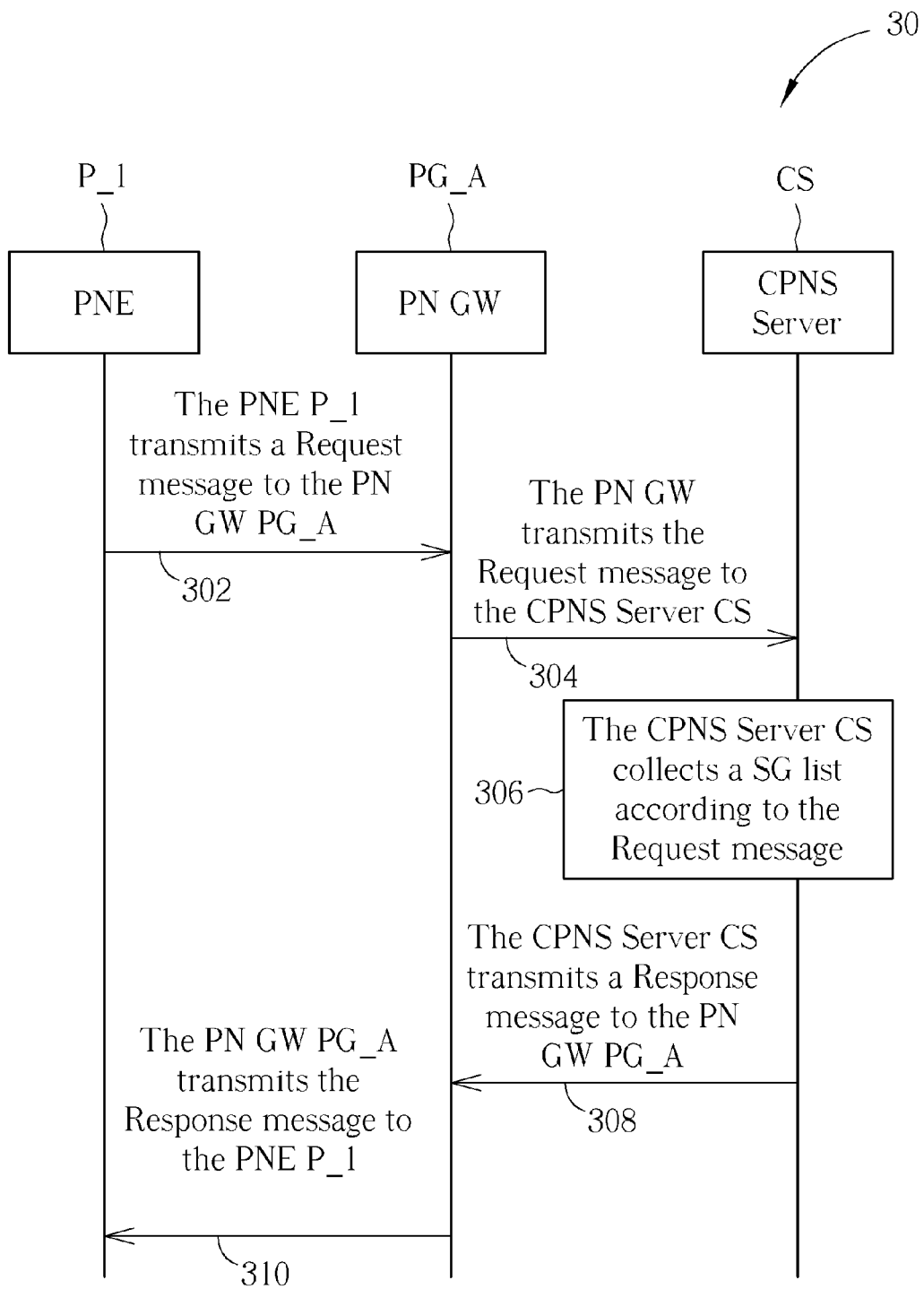
FIG. 3 is a transmission sequence diagram of a Service Group Discovery procedure.

Please refer to FIG. 3, which is a transmission sequence diagram of a Service Group Discovery procedure 30, i.e. Service Group Query procedure. The Service Group Discovery procedure 30 is utilized in the communication system 10 shown in FIG. 1. The Service Group Discovery procedure 30 may be compiled into the program code 214 and includes the following steps:

Step 302: The PNE P_1 transmits a Request message to the PN GW PG_A.

Step 304: The PN GW transmits the Request message to the CPNS Server CS.

Step 306: The CPNS Server CS collects a SG list according to the Request message.

Step 308: The CPNS Server CS transmits a Response message to the PN GW PG_A.

Step 310: The PN GW PG_A transmits the Response message to the PNE P_1.

However, the Service Group Discovery procedure 30 does not specify content and format of the Request message and the Response message and related operations.

Figure 4:
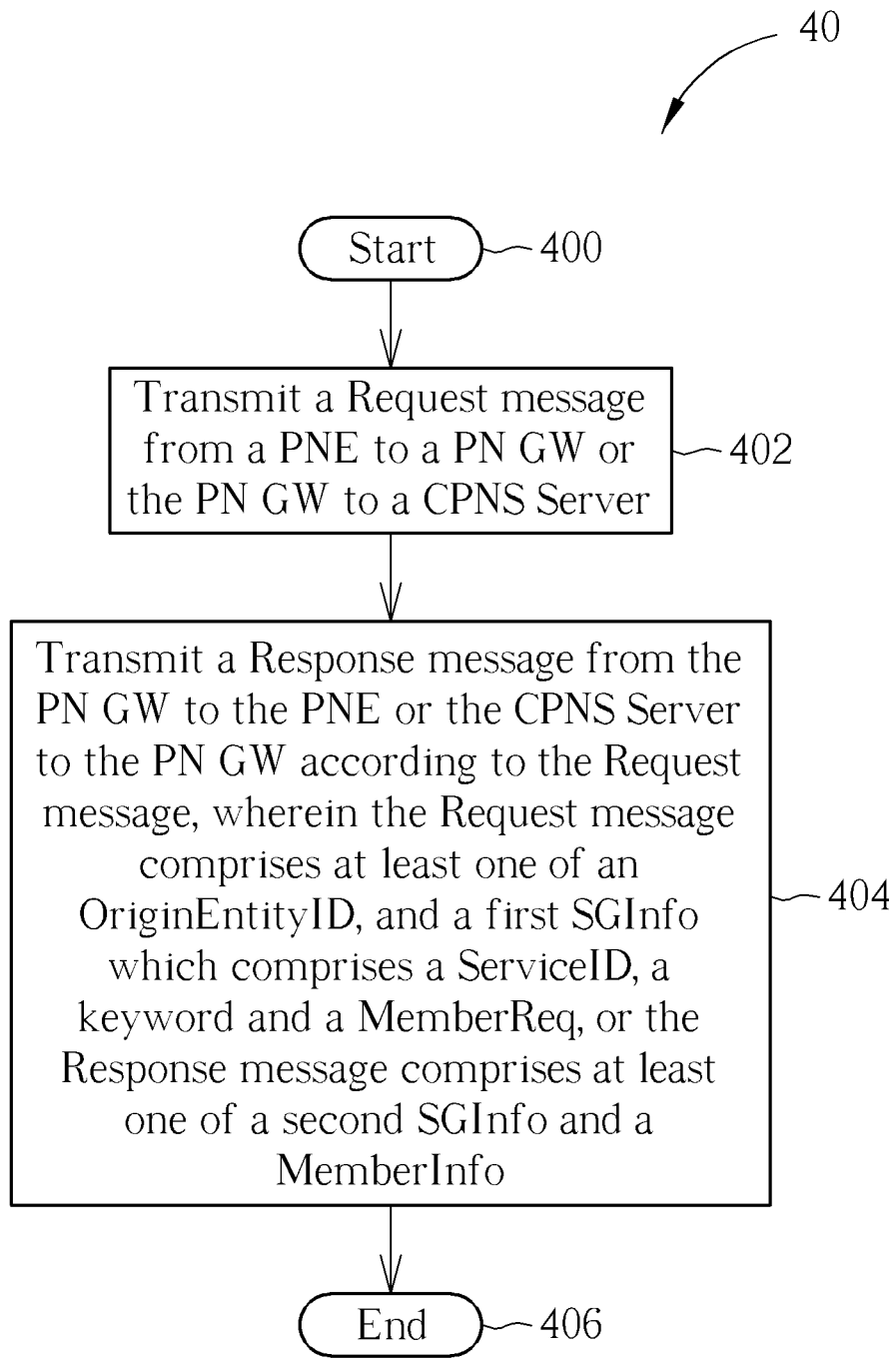
FIG. 4 is a flowchart of an exemplary process according to the present invention.

Under such a situation, please refer to FIG. 4, which is a flowchart of a process 40 according to an example of the present invention. The process 40 is utilized in a PNE, a PN GW or a CPNS Server of the communication system 10 shown in FIG. 1, to performing a Service Group (SG) Discovery procedure, i.e. Service Group List Query procedure. The process 40 may be compiled into the program code 214 and includes the following steps:

Step 400: Start.

Step 402: Transmit a Request message from a PNE to a PN GW or the PN GW to a CPNS Server.

Step 404: Transmit a Response message from the PN GW to the PNE or the CPNS Server to the PN GW according to the Request message, wherein the Request message comprises at least one of an OriginEntityID, and a first SGInfo which comprises a ServiceID, a keyword and a MemberReq, or the Response message comprises at least one of a second SGInfo and a MemberInfo.

Step 406: End.

According to the process 40, when the communication system 10 transmits a Request message, i.e. a Request message, from a PNE to a PN GW (e.g. step 302) or the PN GW to a CPNS Server (e.g. step 304), the Request message comprises at least one of an OriginEntityID (could be a PNE ID or PN GW ID), and a first SGInfo which includes a ServiceID, a keyword (i.e. QueryCriteria) and a MemberReq. The OriginEntityID specifies an identification corresponding to the first PNE which initiates the Service Group Discovery procedure, e.g. the PNEID specifies an identification of the PNE which initiates the Service Group Discovery procedure (e.g. P_1) and the PNE GW ID specifies an identification of a PN GW which the PNE which initiates the Service Group Discovery procedure belongs (e.g. PG_A). The first ServiceID specifies an identification of at least one service queried by the PNE and the keyword specifies query constraints and parameters, such as specific services, or user id. The MemberReq specifies whether the PNE queries SG member information of the service queried by the PNE, e.g. a value of the MemberReq is "True" if the PNE queries the SG member information of the queried service.

Under such a situation, when the PNE intends to query information of current SGs, the PNE can transmit the Request message comprising at least one of the OriginEntityID (could be a PNE ID or PN GW ID), and the first SGInfo which includes the ServiceID, the keyword (i.e. QueryCriteria) and the MemberReq (e.g. step 302), and the PN GW can relay the Request message to the CPNS Server (e.g. step 304) when receiving the Request message. When the CPNS Server receives the Request message, the CPNS Server collects a SG list from SG inventory about existing SG (e.g. step 306), wherein the CPNS Server collects the SG list according to the keyword if the Request message comprises the keyword. Noticeably, if there are some private SG and some related information invisible to other PNEs, the CPNS server also needs to consider privacy concern. As a result, content and format of the Request message and related operations are specified.

On the other hand, when the communication system 10 transmits a Response message, i.e. a Response message, from the PN GW to the PNE (e.g. step 310), or the CPNS Server to the PN GW (e.g. step 308), according to the Request message, the Response message comprises at least one of a second SGInfo (i.e. SGList) and a MemberInfo. The second SGInfo comprises at least one set of a SGID, a SGOwner and a SGDescription corresponding to the at least one SG. The SGID in one set specifies a SG identification, and the SGOwner in the one set specifies an identification of a PNE which is an owner of an SG indicated by the SGID. The SGDescription in the one set specifies an SG description of the SG indicated by the SGID. The MemberInfo specifies the SG member information if the MemberReq indicates the PNE queries the SG member information of the service queried by the PNE, and comprises a PNEID and a Name for specifying a PNE identification and a PNE name, e.g. MP3 player, in the service queried by the PNE. The Response message can further comprise a ServiceInfo, for specifying service information of a service queried by the first PNE. The ServiceInfo comprises a second ServiceID and a ServiceName, for specifying an identification and a service keyword of the service queried by the first PNE, respectively.

Under such a situation, when the CPNS Server responds information of queried SGs with the Response message comprising at least one of the second SGInfo, the MemberInfo and the ServiceInfo (e.g. step 308), the PN GW relays the Response message to the PNE who initiates the Service Group Discovery procedure (e.g. step 310). When PNE initiating the Service Group Discovery procedure receives the Response message, the PNE can know service group identification, the SG owner, and related information of the queried service from the second SGInfo comprising SGID, a SGOwner and a SGDescription, the SG member information such as the PNE identification and the PNE name of the queried service from the MemberInfo comprising the PNEID and the Name if the PNE queries the SG member information by the MemberReq, and service information such as the service identification and the service keyword of the queried service from the ServiceInfo comprising the second ServiceID and the ServiceName. As a result, content and format of the Response message and related operations are specified.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the communication device 20.

In the prior art, content and format of the Request message and the Response message and related operations of a Service Group Discovery procedure is not specified. In comparison, the present inventions specifies content and format of the Request message and the Response message and related operations of a Service Group Discovery procedure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing a Service Group (SG) Discovery procedure in a communication system, the method comprising:
   transmitting a Request message from a first personal network element (PNE) to a personal network (PN) gateway (GW) and then transmitting a Response message from the PN GW to the first PNE according to the Request message; or
   transmitting the Request message from the PN GW to a Converged Personal Network Service (CPNS) Server and then transmitting the Response message from the CPNS Server to the PN GW according to the Request message;
   wherein the Request message comprises an OriginEntityID, and a first SGInfo which comprises a keyword, or the Response message comprises a second SGInfo;
   wherein the Response message further comprises a ServiceInfo, for specifying service information of a service queried by the first PNE, and the ServiceInfo comprises a second ServiceID and a ServiceName, for specifying an identification and a service keyword of the service queried by the first PNE, respectively.

2. The method of claim 1, wherein the first SGInfo further comprises at least one of a first ServiceID and a MemberReq.

3. The method of claim 2, wherein the first ServiceID specifies an identification of at least one service queried by the first PNE.

4. The method of claim 2, wherein the MemberReq specifies whether the first PNE queries SG member information.

5. The method of claim 1, wherein the OriginEntityID specifies an identification corresponding to the first PNE which initiates the Service Group Discovery procedure.

6. The method of claim 1, wherein the keyword specifies query constraints and parameters.

7. The method of claim 1, wherein the CPNS Server collects a SG list according to the keyword if the Request message comprises the keyword.

8. The method of claim 1, wherein the second SGInfo comprises at least one set, and each set of the at least one set comprises a SGID, a SGOwner and a SGDescription corresponding to at least one SG.

9. The method of claim 8, wherein the SGID in one set specifies a SG identification.

10. The method of claim 8, wherein the SGOwner in one set specifies an identification of a second PNE which is an owner of an SG indicated by the SGID.

11. The method of claim 8, wherein the SGDescription in one set specifies an SG description of an SG indicated by the SGID.

12. The method of claim 1, wherein the Response message further comprises a MemberInfo.

13. The method of claim 12, wherein the MemberInfo specifies the SG member information if a MemberReq indicates the first PNE queries the SG member information.

14. The method of claim 12, wherein the MemberInfo comprises a PNEID and a Name for specifying a PNE identification and a PNE name in a service queried by the first PNE.

* * * * *